US006966214B2

(12) United States Patent

Watanabe et al.

(10) Patent No.: US 6,966,214 B2

(45) Date of Patent: Nov. 22, 2005

(54) LEAKAGE DIAGNOSIS APPARATUS FOR FUEL VAPOR PURGE SYSTEM AND METHOD THEREOF

(75) Inventors: Satoru Watanabe, Atsugi (JP); Hajime Hosoya, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/865,849

(22) Filed: Jun. 14, 2004

(65) Prior Publication Data

US 2004/0250604 A1 Dec. 16, 2004

(30) Foreign Application Priority Data

Jun. 16, 2003 (JP) ............................ 2003-170188

(51) Int. Cl.[7] ................................................ G01M 3/04

(52) U.S. Cl. ........................................................ 73/49.2

(58) Field of Search .......................................... 73/49.7

(56) References Cited

U.S. PATENT DOCUMENTS

| | | | | |
|---|---|---|---|---|
| 5,146,902 | A * | 9/1992 | Cook et al. | 123/518 |
| 5,575,265 | A * | 11/1996 | Kurihara et al. | 123/520 |
| 5,957,115 | A * | 9/1999 | Busato et al. | 123/520 |
| 6,044,314 | A * | 3/2000 | Cook et al. | 701/31 |
| 6,082,189 | A * | 7/2000 | Bayerle et al. | 73/118.1 |
| 6,082,337 | A * | 7/2000 | Fujimoto et al. | 123/520 |
| 6,182,642 | B1 * | 2/2001 | Ohkuma | 123/520 |
| 6,269,803 | B1 * | 8/2001 | Corkill | 123/520 |
| 6,276,343 | B1 * | 8/2001 | Kawamura et al. | 123/520 |
| 6,301,955 | B1 * | 10/2001 | Cook et al. | 73/49.7 |
| 6,321,727 | B1 * | 11/2001 | Reddy et al. | 123/520 |
| 6,382,017 | B1 * | 5/2002 | Majkowski et al. | 73/49.7 |
| 6,474,148 | B2 * | 11/2002 | Takagi et al. | 73/118.1 |
| 6,536,261 | B1 * | 3/2003 | Weldon et al. | 73/49.7 |
| 6,604,407 | B2 * | 8/2003 | Kano et al. | 73/49.7 |
| 6,658,925 | B2 * | 12/2003 | Cook et al. | 73/118.1 |
| 6,698,280 | B1 * | 3/2004 | Iden et al. | 73/118.1 |
| 6,807,851 | B2 * | 10/2004 | Wakahara et al. | 73/118.1 |
| 6,834,535 | B2 * | 12/2004 | Kano et al. | 73/49.7 |

FOREIGN PATENT DOCUMENTS

JP 11-343927 A 12/1999

* cited by examiner

*Primary Examiner*—Thomas P. Noland
*Assistant Examiner*—John Fitzgerald
(74) *Attorney, Agent, or Firm*—Foley & Lardner LLP

(57) ABSTRACT

In a fuel vapor purge system, an occurrence of leakage in a diagnosis zone is diagnosed, based on data indicating a pressure rise characteristic in the diagnosis zone for when the diagnosis zone is pressurized, and data indicating a pressure drop characteristic in the diagnosis zone after the pressurization of the diagnosis zone is stopped.

14 Claims, 4 Drawing Sheets

LEAKAGE DIAGNOSIS APPARATUS FOR FUEL VAPOR PURGE SYSTEM AND METHOD THEREOF

FIELD OF THE INVENTION

The present invention relates to a leakage diagnosis apparatus for a fuel vapor purge system used in a vehicle installed internal combustion engine, and a method thereof.

RELATED ART

The above described fuel vapor purge system has a configuration in which fuel vapor generated in a fuel tank is trapped in a canister, and the fuel vapor trapped in the canister is purged into an intake passage of an internal combustion engine.

Japanese Unexamined Patent Publication No. 11-343927 discloses an apparatus for diagnosing an occurrence of leakage in the fuel vapor purge system.

In this diagnosis apparatus, an occurrence of leakage is diagnosed based on a pressure change amount in a diagnosis zone for when a pressure in the diagnosis zone is decreased by an intake negative pressure of an internal combustion engine.

However, if the leakage diagnosis is performed by the diagnosis apparatus on a condition that an amount of fuel vapor desorbed from a canister is large, a large amount of fuel vapor is sucked into the engine, and as a result, an air-fuel ratio in the engine is varied significantly.

Accordingly, the leakage diagnosis by the diagnosis apparatus needs to be executed when the amount of fuel vapor desorbed from the canister is less.

However, if the leakage diagnosis is performed on a condition that the amount of fuel vapor desorbed from the canister is less, the frequency of diagnosis is lowered.

Further, in such a method in which an occurrence of leakage is diagnosed based on only the pressure change amount for when the pressure in the diagnosis zone is decreased, it is difficult to diagnose accurately the existence of leak hole having a small diameter.

SUMMARY OF THE INVENTION

The present invention has an object to provide a leakage diagnosis apparatus and a method thereof, capable of ensuring opportunities of leakage diagnosis and also diagnosing an occurrence of leakage with accuracy.

In order to achieve the above object, the present invention has a configuration in which:

a diagnosis zone including at least one of an evaporation passage, a canister and a purge passage, is blocked and then the diagnosis zone is pressurized;

data indicating a pressure rise characteristic in the diagnosis zone for when the diagnosis zone is pressurized, is detected, and data indicating a pressure drop characteristic in the diagnosis zone after the pressurization of the diagnosis zone is stopped; and an occurrence of leakage in the diagnosis zone is diagnosed based on the data indicating the pressure rise characteristic and the data indicating the pressure drop characteristic.

The other objects and features of this invention will become understood from the following description with reference to the accompanying drawings.

DESCRIPTION OF EMBODIMENTS

Figure 1:
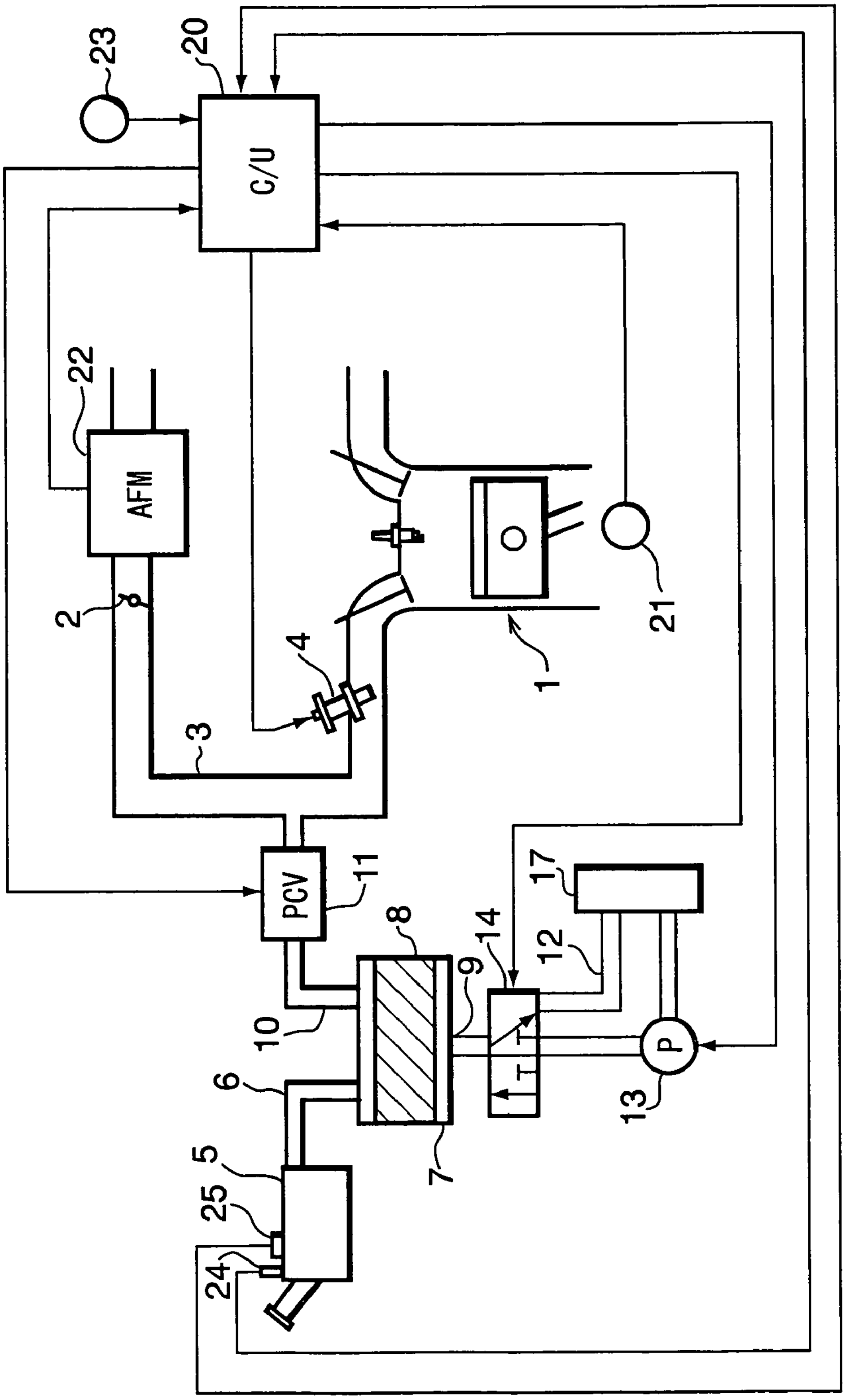
FIG. 1 is a diagram showing a system configuration of an internal combustion engine in an embodiment.

FIG. 1 is a diagram showing a system configuration of an internal combustion engine in an embodiment.

In FIG. 1, an internal combustion engine 1 is a gasoline engine installed in a vehicle (not shown in the figure).

A throttle valve 2 is disposed in an intake system of internal combustion engine 1.

An intake air amount of engine 1 is controlled according to an opening of throttle valve 2.

For each cylinder, an electromagnetic type fuel injection valve 4 is disposed in a manifold portion of an intake passage 3 on the downstream side of throttle valve 2.

Fuel injection valve 4 is opened based on an injection pulse signal output from a control unit 20, to inject fuel.

Internal combustion engine 1 is provided with a fuel vapor purge system comprising an evaporation passage 6, a canister 7, a purge passage 10 and a closed type purge control valve 11.

In the fuel vapor purge system, fuel vapor generated in a fuel tank 5 is introduced to canister 7 via evaporation passage 6, to be adsorbed to canister 7.

Canister 7 is a container filled with the adsorbent 8 such as activated carbon.

Further, a new air inlet 9 is formed to canister 7, and purge passage 10 is extended out from the canister.

Purge passage 10 is connected to intake passage 3 on the downstream side of throttle valve 2.

Purge control valve 11 is disposed in the halfway of purge passage 10.

An opening of purge control valve 11 is controlled based on a purge control signal output from control unit 20.

When a predetermined purge permission condition is established during an operation of engine 1, control unit 20 controls purge control valve 11 to open.

Then, as a result that an intake negative pressure of engine 1 acts on canister 7, the fuel vapor adsorbed in canister 7 is purged by the fresh air introduced through new air inlet 9.

Purged gas inclusive of the purged fuel vapor passes through purge passage 10 to be sucked in intake passage 3.

In order to diagnose an occurrence of leakage in the fuel vapor purge system, an electric-motor driven air pump 13 is disposed on the new air inlet 9 side of canister 7.

Further, there is disposed an electromagnetic type switching valve 14, which connects new air inlet 9 to either an outside-air communicating aperture 12 or a discharge opening of air pump 13.

Switching valve 14 connects new air inlet 9 to outside-air communicating aperture 12 in an OFF condition thereof, and to the discharge opening of air pump 13 in an ON condition thereof.

Further, there is disposed an air filter 17, which is common to outside-air communicating aperture 12 and a suction opening of air pump 13.

Control unit 20 incorporating therein a microcomputer, receives signals from various sensors.

As the various sensors, there are provided a crank angle sensor 21 outputting a crank angle signal, an air flow meter 22 detecting an intake air amount of engine 1, a vehicle speed sensor 23 detecting a running speed of the vehicle in which engine 1 is installed, a pressure sensor 24 detecting a gas pressure inside fuel tank 5, and a fuel gauge 25 detecting a remaining fuel quantity in fuel tank 5.

Control unit 20 controls fuel injection valve 4 and purge control valve 11 based on engine operating conditions detected by the various sensors.

Further, control unit 20 controls air pump 13 and switching valve 14, to diagnose an occurrence of leakage in the fuel vapor purge system.

Figure 2:
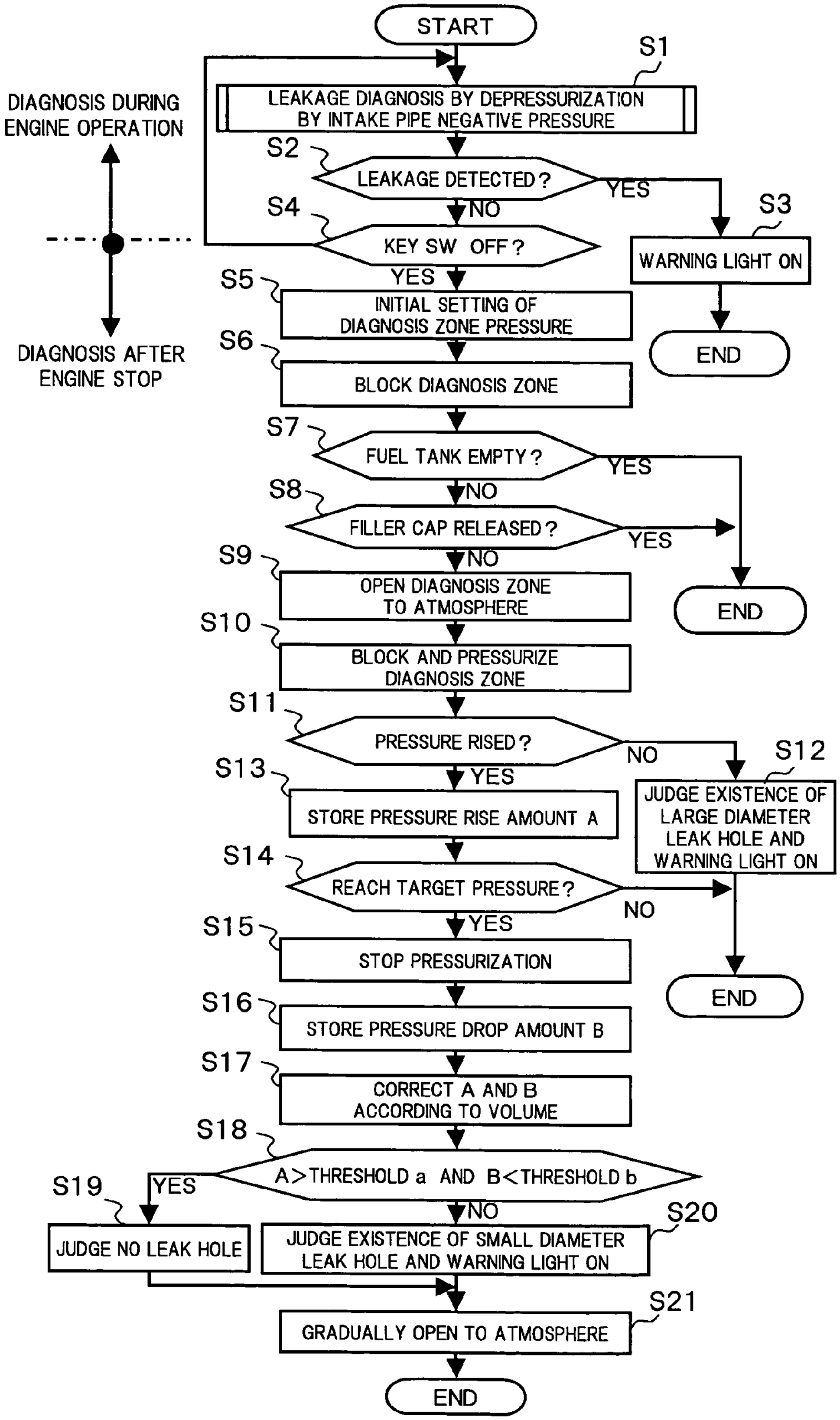
FIG. 2 is a flowchart showing the leakage diagnosis in the embodiment.

A flowchart of FIG. 2 shows the detail of leakage diagnosis.

Figure 3:
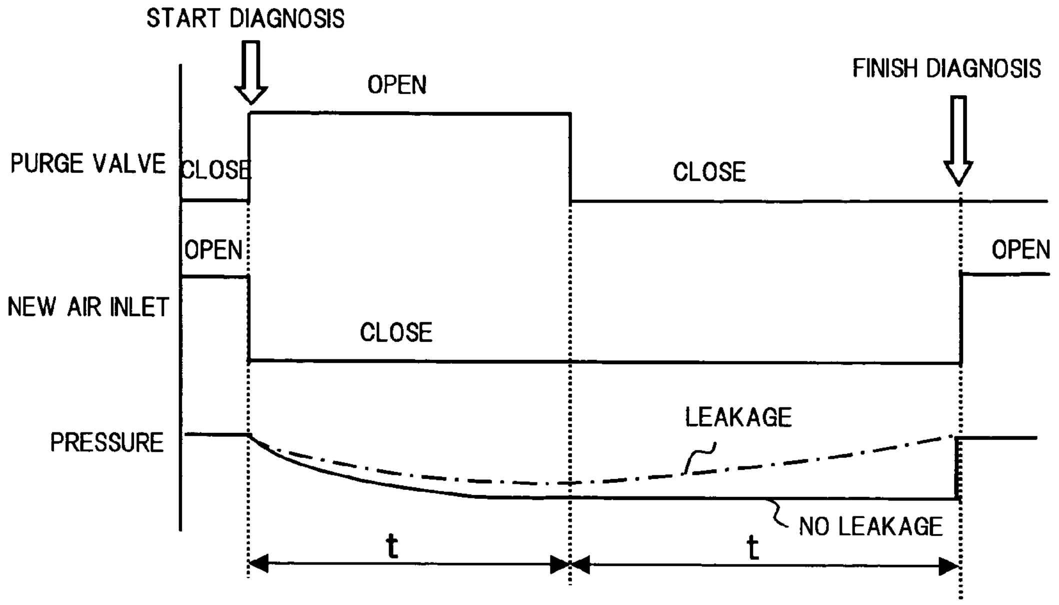
FIG. 3 is a time chart showing valve opening and closing states, and a pressure change in the leakage diagnosis during an engine operation in the embodiment.

In the flowchart of FIG. 2, in step S1, the leakage diagnosis utilizing an intake pipe negative pressure is performed during the operation of engine 1 (refer to FIG. 3).

In the leakage diagnosis of Step S1, when a predetermined diagnosis condition is established, firstly new air inlet 9 of canister 7 is shielded by means of switching valve 14.

As a result that new air inlet 9 is shielded by switching valve 14, a diagnosis zone including fuel tank 5, evaporation passage 6, canister 7 and purge passage 10 is blocked.

Next, purge control valve 11 is controlled to open, so that an intake negative pressure of engine 1 is introduced into the blocked diagnosis zone.

Here, after decreasing the pressure in the diagnosis zone for a first predetermined period of time, purge control valve 11 is closed to confine the negative pressure in the diagnosis zone.

Then, in the case where the pressure in the diagnosis zone rises by a predetermined amount or more within a second predetermined period of time after purge control valve is closed, an occurrence of leakage is judged.

On the other hand, in the case where the pressure in the diagnosis zone does not rise by the predetermined amount or more, no leakage is judged.

In step S2, it is judged whether or not the occurrence of leakage was judged as a result of the leakage diagnosis utilizing the intake pipe negative pressure.

When the occurrence of leakage was judged, control proceeds to step S3, where a warning light disposed in the vicinity of a driver's seat or the like in the vehicle is turned on, to warn the occurrence of leakage to the driver.

Note, the warning light may be a character display warning the occurrence of leakage in the fuel vapor purge system or a warning to merely urge the repair.

When the occurrence of leakage is judged by the diagnosis during the operation of engine, the leakage diagnosis after the engine stop to be described later is not performed.

On the other hand, when the leakage is not detected by the diagnosis during the operation of engine, control proceeds to step S4.

In step S4, it is judged whether or not a key switch is turned OFF.

Control returns to step S1 until the key switch is turned OFF.

If it is judged that the key switch is turned OFF, and then engine 1 is stopped, control proceeds to step S5.

Note, in the leakage diagnosis after the engine stop, air pump 13 is used, as described later. However, for this purpose, the diagnosis is started on a condition that a voltage of a battery being a power source of air pump 13 is a predetermined value or above. Hence, it is prevented that the battery is drained due to the power supply to air pump 13, to be unable the engine restart.

In step S5, switching valve 14 is controlled to open new air inlet 9 of canister 7 to the atmosphere. As a result, the pressure in the diagnosis zone becomes equal to the atmospheric pressure.

In step S6, switching valve 14 is controlled to shield new air inlet 9 of canister 7.

Here, since purge control valve 11 is previously in a closed state, the diagnosis zone becomes in a sealed state by shielding new air inlet 9.

Then, the fuel in fuel tank 5 is evaporated, so that the pressure in the diagnosis zone rises.

Here, the volatility of the fuel is estimated based on a pressure rise characteristic of the diagnosis zone due to the fuel evaporation.

To be specific, a difference between a previously stored pressure change for when the fuel of standard volatility is used, and an actual pressure change, is calculated, and the volatility of the fuel is estimated based on the difference.

In step S7, it is judged whether or not the remaining fuel quantity in fuel tank 5, which is detected by fuel gauge 25 is equal to or less than a predetermined amount.

When the remaining fuel quantity is the predetermined amount or less (when the fuel tank is empty), the present routine is terminated without executing the leakage diagnosis after the engine stop.

The termination process of the present routine means that control unit 20 cuts power off by itself.

If the remaining fuel quantity is less, the spatial volume of the diagnosis zone becomes large, so that the detection sensibility of pressure change due to the occurrence of leakage is lowered.

Therefore, in the present embodiment, when the remaining fuel quantity is more than the predetermined amount and the spatial volume of the diagnosis zone is smaller than a predetermined value, the diagnosis zone is pressurized to perform the leakage diagnosis.

Note, the configuration may be such that the leakage diagnosis after the engine stop is prohibited when the remaining fuel quantity is equal to or less than the predetermined amount and/or the remaining fuel quantity is equal to or more than a second predetermined amount, which approximates a maximum remaining quantity.

Further, in step S8, it is judged whether or not a filler cap of fuel tank 5 is released.

To be specific, it is judged whether or not the pressure in the diagnosis zone rises by a predetermined value or above within a predetermined period of time.

Since control proceeds to step S8 when it is just after the engine stop and also the diagnosis zone is sealed, normally, the pressure in the diagnosis zone rises due to the evaporation of the fuel.

Accordingly, the pressure in the diagnosis zone does not exhibit the predicated pressure rise, there is a possibility that the filler cap is released.

Then, the diagnosis by pressurizing the diagnosis zone cannot be performed in a state where the filler cap is released. Therefore, the present routine is terminated without performing the leakage diagnosis by pressurizing the diagnosis zone after the engine stop.

Note, in the case where there is provided a switch detecting as to whether the filler cap is released or tightened, it is possible to judge based on the ON/OFF of the switch whether or not the leakage diagnosis is to be canceled.

In step S9, switching valve 14 is controlled to open new air inlet 9 of canister 7 to the atmosphere.

In step S10, switching valve 14 is controlled to connect new air inlet 9 to the discharge opening of air pump 13. Then, the pressurization of the diagnosis zone by air pump 13 is started.

In step S11, it is judged whether or not a pressure P in the diagnosis zone rises by a predetermined amount α or more as a result that the diagnosis zone is pressurized for a predetermined period of time t1.

Namely, a difference between the pressure in the diagnosis zone at the starting time of pressurization and the pressure in the diagnosis zone after the pressurization for the predetermined period of time t1, is calculated as a pressure rise amount A, and it is judged whether or not the pressure rise amount A is equal to or more than the predetermined amount α.

When the pressure rise amount A is less than the predetermined amount α, control proceeds to step S12.

In step S12, it is judged that a large leak hole exists in the diagnosis zone, to turn on the warning light warning the occurrence of leakage.

Figure 4:
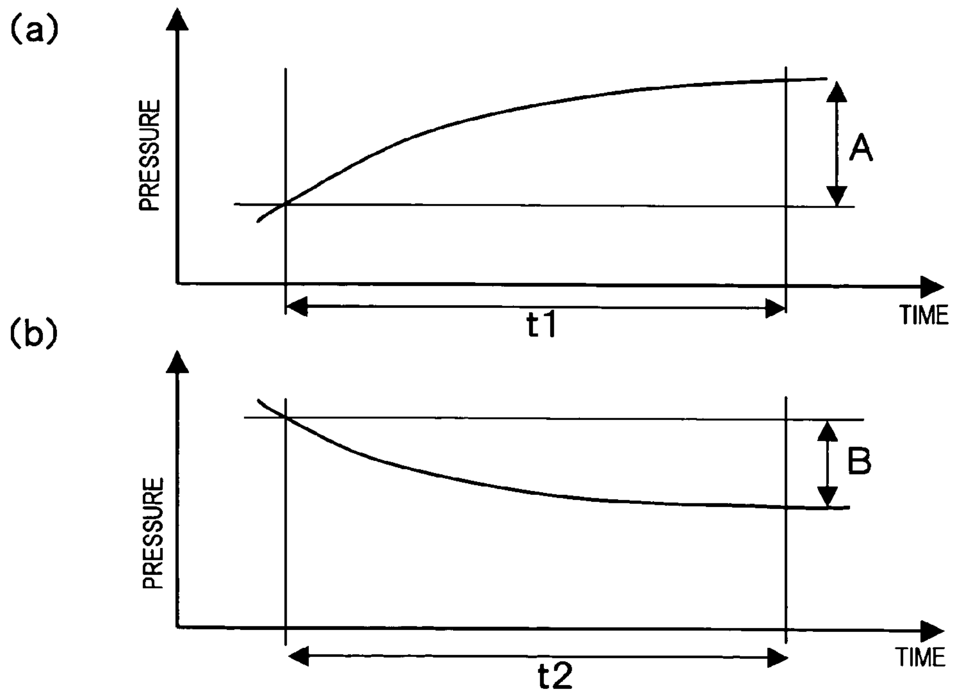
FIG. 4 is a time chart showing a pressure change amount A when the diagnosis zone is pressurized after the engine stop and a pressure change amount B after the pressurization is stopped in the embodiment.

On the other hand, when the pressure rise amount A is equal to or more than the predetermined amount α, control proceeds to step S13, where the pressure rise amount A is stored (refer to (a) of FIG. 4).

In step S14, it is judged whether or not the pressure P in the diagnosis zone rose up to a target pressure Pt.

If the pressure P in the diagnosis zone does not reach the target pressure Pt, since the accuracy of leakage diagnosis based on the pressure drop characteristic after the stop of pressurization, is lowered, the present routine is terminated without proceeding to the leakage diagnosis process in step S5 and the subsequent steps.

On the other hand, when it is judged in step S14 that the pressure P in the diagnosis zone reaches the target pressure Pt, control proceeds to step S15.

In step S15, the operation of air pump 13 is stopped, and the pressurization of the diagnosis zone is stopped.

In next step S16, a pressure drop amount B within a predetermined period of time t2 after the pressurization of the diagnosis zone is stopped, is detected to be stored (refer to (b) of FIG. 4).

If the pressurization of the diagnosis zone is stopped, the pressure in the diagnosis zone is maintained in the case where there is no leakage in the diagnosis zone. However, in the case where there is the leakage in the diagnosis zone, the larger the diameter of leak hole is, the larger the pressure in the diagnosis zone is lowered.

In step S17, the pressure rise amount A and the pressure drop amount B are corrected based on the remaining fuel quantity in fuel tank 5.

Namely, since the volume of the diagnosis zone is changed depending on the remaining fuel quantity in fuel tank 5, different pressure changes are shown even if the leak hole diameter is same.

Therefore, the pressure rise amount A and the pressure drop amount B are corrected based on the remaining fuel quantity, so that the pressure rise amount A and the pressure drop amount B are converted into pressure change amounts in the standard volume.

Further, in step S17, the correction according to the volatility of the fuel estimated in step S6 is performed on each of the pressure rise amount A and the pressure drop amount B.

This is because the pressure change due to the fuel vapor affects the pressure rise amount A and the pressure drop amount B, during the pressurization and after the stop of pressurization.

In step S18, it is judged whether or not the pressure rise amount A is larger than a threshold "a" and also the pressure drop amount B is smaller than a threshold Note, threshold "a" is a value larger than the predetermined value α.

If the leak hole exists in the diagnosis zone, the pressure rise amount A is decreased, while the pressure drop amount B being increased.

In the case where it is judged that the pressure rise amount A is larger than the threshold "a" and also the pressure drop amount B is smaller than the threshold "b", control proceeds to step S19, where it is judged that there is no leakage.

On the other hand, if the pressure rise amount A is the threshold "a" or less, and/or the pressure drop amount B is the threshold "b" or more, control proceeds to step S20.

In step S20, it is judged that a leak hole of a diameter smaller than that of the leak hole judged in step S12, exists in the diagnosis zone, and the warning light warning the occurrence of leakage is turned on.

Here, it is possible to warn by discriminating between the sizes of leak holes.

Note, it is also possible to correct the thresholds "a" and "b" based on the remaining fuel quantity in fuel tank 5 and the volatility of the fuel, instead of the correction of the pressure rise amount A and the pressure drop amount B based on the remaining fuel quantity in fuel tank 5 and the volatility of the fuel.

It is possible to judge the volatility of the fuel based on a result of feedback correction of ignition timing based on a detection of knocking.

In step S21, switching valve 14 is controlled to open new air inlet 9 of canister 7 to the atmosphere.

However, if the pressure in the diagnosis zone is abruptly released, there is a possibility that the fuel vapor is spout out from new air inlet 9. Therefore, an opening area of new air inlet 9 is gradually extended or an opening time ratio of new air inlet 9 is gradually increased.

According to the above configuration, during the engine operation, the leakage diagnosis is performed based on the pressure change by depressurization process with the intake pipe negative pressure of the engine, and further, the leakage diagnosis is performed based on the pressure change by the pressurization process with the air pump just after the engine stop. Therefore, the frequency of diagnosis is improved.

Further, in the leakage diagnosis just after the engine stop, the leakage diagnosis is performed based on the pressure rise amount A by the pressurization and the pressure drop amount B after the stop of pressurization. Therefore, it is possible to diagnose a relatively small leak hole with accuracy.

Moreover, since the pressure change amount is regulated corresponding to a change in volume of the blocked diagnosis zone depending on the difference in the remaining fuel quantity. Therefore, even if the remaining fuel quantity differs, the leakage diagnosis can be performed with accuracy.

Furthermore, when the blocked zone pressurized for the leakage diagnosis is opened to return the atmospheric pressure, it is possible to avoid that the fuel vapor is spout out from new air inlet 9.

Figure 5:
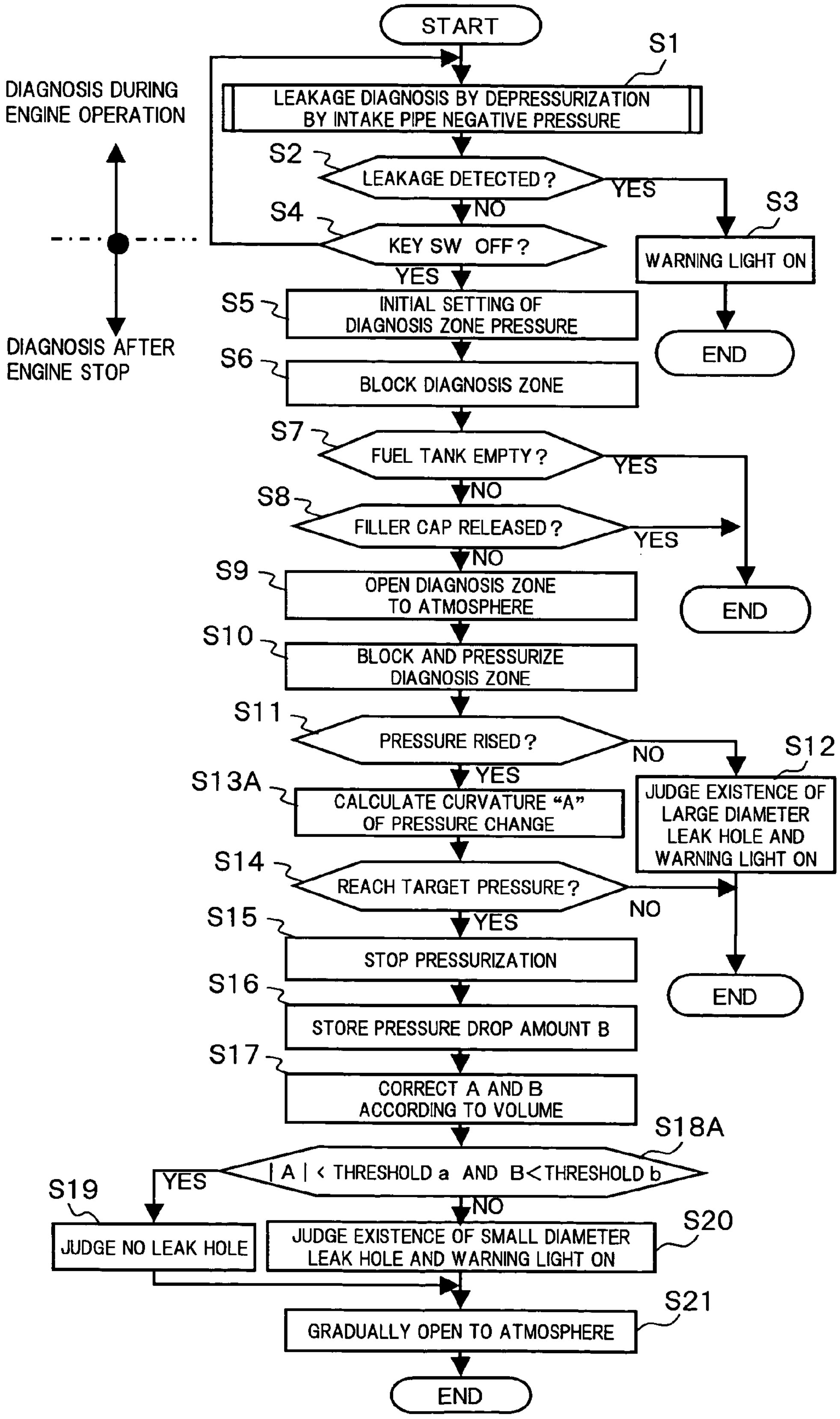
FIG. 5 is a flowchart showing the leakage diagnosis in a second embodiment.

A flowchart of FIG. 5 shows a second embodiment of the leakage diagnosis.

The second embodiment shown in the flowchart of FIG. 5 differs from the first embodiment shown in the flowchart of FIG. 2 in that the curvature of pressure change is obtained as a parameter showing the pressure rise characteristic.

Specifically, in the flowchart of FIG. 5, only the processes of step S13A and step 18A differ from those in the flowchart of FIG. 2.

In step S13A, the curvature A of a pressure change curve during the pressurization of the diagnosis zone by air pump 13, is calculated to be stored.

Then, in step 18A, it is judged whether or not an absolute value of the curvature A is smaller than the threshold "a" and also the pressure drop amount B is smaller than the threshold "b".

In the case where there is no leakage in the diagnosis zone, since the pressure in the diagnosis zone rises with the pressurization by air pump 13, at an approximately fixed speed, the curvature A of the pressure change curve shows a small value.

On the other hand, if there is the leakage in the diagnosis zone, as a result that the pressure rise speed in the diagnosis zone is gradually lowered, the absolute value of the curvature of the pressure change curve becomes large.

Accordingly, in the case where the absolute value of the curvature A of the pressure change curve is the threshold "a" or above, control proceeds to step S20, where it is judged that the small diameter leak hole exists in the diagnosis zone.

The entire contents of Japanese Patent Application No. 2003-170188 filed on Jun. 16, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed is:

1. A leakage diagnosis apparatus for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising:

a blocking device configured to block a diagnosis zone containing at least one of said fuel tank, said evaporation passage, said canister and said purge passage;

a pressurizer that pressurizes said diagnosis zone;

a pressure detector configured to detect a pressure in said diagnosis zone; and a diagnosis unit that outputs control signals to said blocking device and said pressurizer, and also receives a detection signal as an input signal from said pressure detector, to diagnose an occurrence of leakage in said diagnosis zone, wherein said diagnosis unit blocks said diagnosis zone by said blocking device, and detects data indicating a pressure rise characteristic in said diagnosis zone for when said diagnosis zone is pressurized by said pressurizer based on the detection signal from said pressure detector and also detects data indicating a pressure drop characteristic in said diagnosis zone after the pressurization by said pressurizer is stopped, and diagnoses an occurrence of leakage in said diagnosis zone based on the data indicating said pressure rise characteristic and the data indicating said pressure drop characteristic, wherein said diagnosis unit:

detects the curvature of a pressure change curve during the pressurization by said pressurizer as the data indicating said pressure rise characteristic, and detects a pressure drop amount within a period of time after the stop of pressurization by said pressurizer as the data indicating said pressure drop characteristic;

judges that there is no leakage, when an absolute value of said curvature is smaller than a first threshold, and also said pressure drop amount is smaller than a second threshold;

judges an occurrence of leakage when the absolute value of said curvature is equal to or larger than the first threshold; and judges an occurrence of leakage when said pressure drop amount is equal to or larger than the second threshold.

2. A leakage diagnosis apparatus for a fuel vapor purge system in which fuel vapor generating in a fuel tank is trapped in a canister via an evaporation passage, and the fuel vapor trapped in said canister is purged, via a purge passage, into an intake passage of an internal combustion engine, comprising:

a blocking device configured to block a diagnosis zone containing at least one of said fuel tank, said evaporation passage, said canister and said purge passage;

a pressurizer that pressurizes said diagnosis zone;

a pressure detector configured to detect a pressure in said diagnosis zone;

a diagnosis unit that outputs control signals to said blocking device and said pressurizer, and also receives a detection signal as an input signal from said pressure detector, to diagnose an occurrence of leakage in said diagnosis zone; and a remaining quantity detector configured to detect a remaining fuel quantity in said fuel tank, wherein said diagnosis unit blocks said diagnosis zone by said blocking device, and detects data indicating a pressure rise characteristic in said diagnosis zone for when said diagnosis zone is pressurized by said pressurizer based on the detection signal from said pressure detector and also detects data indicating a pressure drop characteristic in said diagnosis zone after the pressurization by said pressurizer is stopped, and diagnoses an occurrence of leakage in said diagnosis zone based on the data indicating said pressure rise characteristic and the data indicating said pressure drop characteristic, wherein said blocking device blocks a diagnosis zone containing said fuel tank, and wherein said diagnosis unit corrects the data indicating said pressure rise characteristic and the data indicating said pressure drop characteristic based on said remaining fuel quantity detected by said remaining quantity detector, to diagnose an occurrence of leakage based on said corrected data.

3. A leakage diagnosis apparatus for a fuel vapor purge system in which fuel vapor generating in a fuel tank is trapped in a canister via an evaporation passage, and the fuel vapor trapped in said canister is purged, via a purge passage, into an intake passage of an internal combustion engine, comprising:

a blocking device configured to block a diagnosis zone containing at least one of said fuel tank, said evaporation passage, said canister and said purge passage;

a pressurizer that pressurizes said diagnosis zone;

a pressure detector configured to detect a pressure in said diagnosis zone;

a diagnosis unit that outputs control signals to said blocking device and said pressurizer, and also receives a detection signal as an input signal from said pressure detector, to diagnose an occurrence of leakage in said diagnosis zone; and a fuel property detector configured to detect a fuel property in said fuel tank, wherein said diagnosis unit blocks said diagnosis zone by said blocking device, and detects data indicating a pressure rise characteristic in said diagnosis zone for when said diagnosis zone is pressurized by said pressurizer based on the detection signal from said pressure detector and also detects data indicating a pressure drop characteristic in said diagnosis zone after the pressurization by said pressurizer is stopped, and diagnoses an occurrence of leakage in said diagnosis zone based on the data indicating said pressure rise characteristic and the data indicating said pressure drop characteristic, wherein said blocking device blocks a diagnosis zone containing said fuel tank, and wherein said diagnosis unit corrects the data indicating said pressure rise characteristic and the data indicating said pressure drop characteristic based on the fuel property detected by said fuel property detector, to diagnose an occurrence of leakage based on said corrected data.

4. A leakage diagnosis apparatus for a fuel vapor purge system according to claim 3, wherein said fuel property detector detects said fuel property based on the data indicating said pressure rise characteristic in said diagnosis zone due to the fuel vapor when said diagnosis zone is blocked by said blocking device.

5. A leakage diagnosis apparatus for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising:

a blocking device configured to block a diagnosis zone containing at least one of said fuel tank, said evaporation passage, said canister and said purge passage;

a pressurizer that pressurizes said diagnosis zone;

a pressure detector configured to detect a pressure in said diagnosis zone; and a diagnosis unit that outputs control signals to said blocking device and said pressurizer, and also receives a detection signal as an input signal from said pressure detector, to diagnose an occurrence of leakage in said diagnosis zone, wherein said diagnosis unit blocks said diagnosis zone by said blocking device, and detects data indicating a pressure rise characteristic in said diagnosis zone for when said diagnosis zone is pressurized by said pressurizer based on the detection signal from said pressure detector and also detects data indicating a pressure drop characteristic in said diagnosis zone after the pressurization by said pressurizer is stopped, and diagnoses an occurrence of leakage in said diagnosis zone based on the data indicating said pressure rise characteristic and the data indicating said pressure drop characteristic, wherein said blocking device:

blocks a diagnosis zone containing said fuel tank; and comprises a remaining quantity detector configured to detect a remaining fuel quantity in said fuel tank, and said diagnosis unit suspends the diagnosis of said occurrence of leakage when said remaining fuel quantity is equal to or less than a predetermined amount.

6. A leakage diagnosis apparatus for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising:

a blocking device configured to block a diagnosis zone containing at least one of said fuel tank, said evaporation passage, said canister and said purge passage;

a pressurizer that pressurizes said diagnosis zone;

a pressure detector configured to detect a pressure in said diagnosis zone; and a diagnosis unit that outputs control signals to said blocking device and said pressurizer, and also receives a detection signal as an input signal from said pressure detector, to diagnose an occurrence of leakage in said diagnosis zone, wherein said diagnosis unit blocks said diagnosis zone by said blocking device, and detects data indicating a pressure rise characteristic in said diagnosis zone for when said diagnosis zone is pressurized by said pressurizer based on the detection signal from said pressure detector and also detects data indicating a pressure drop characteristic in said diagnosis zone after the pressurization by said pressurizer is stopped, and diagnoses an occurrence of leakage in said diagnosis zone based on the data indicating said pressure rise characteristic and the data indicating said pressure drop characteristic, wherein said blocking device:

blocks a diagnosis zone containing said fuel tank; and comprises a remaining quantity detector configured to detect a remaining fuel quantity in said fuel tank, and said diagnosis unit suspends the diagnosis of said occurrence of leakage when said remaining fuel quantity is equal to or more than a predetermined amount.

7. A leakage diagnosis apparatus for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising:

a blocking device configured to block a diagnosis zone containing at least one of said fuel tank, said evaporation passage, said canister and said purge passage;

a pressurizer that pressurizes said diagnosis zone;

a pressure detector configured to detect a pressure in said diagnosis zone; and a diagnosis unit that outputs control signals to said blocking device and said pressurizer, and also receives a detection signal as an input signal from said pressure detector, to diagnose an occurrence of leakage in said diagnosis zone, wherein said diagnosis unit blocks said diagnosis zone by said blocking device, and detects data indicating a pressure rise characteristic in said diagnosis zone for when said diagnosis zone is pressurized by said pressurizer based on the detection signal from said pressure detector and also detects data indicating a pressure drop characteristic in said diagnosis zone after the pressurization by said pressurizer is stopped, and diagnoses an occurrence of leakage in said diagnosis zone based on the data indicating said pressure rise characteristic and the data indicating said pressure drop characteristic, wherein said blocking device blocks a diagnosis zone containing said fuel tank, and said diagnosis unit suspends the diagnosis of occurrence of leakage when a pressure rise amount in said diagnosis zone due to the fuel vapor for when said diagnosis zone is blocked by said blocking device, does not reach a predetermined value within a period of time.

8. A leakage diagnosis method for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

pressurizing said diagnosis zone;

detecting the pressure in said diagnosis zone;

detecting data indicating a pressure rise characteristic in said diagnosis zone for when said diagnosis zone is pressurized in a state where said diagnosis zone is blocked;

detecting data indicating a pressure drop characteristic in said diagnosis zone after the pressurization of said diagnosis zone is stopped; and diagnosing an occurrence of leakage in said diagnosis zone based on the data indicating said pressure rise characteristic and the data indicating said pressure drop characteristic, wherein said step of detecting the data indicating said pressure rise characteristic:

detects the curvature of a pressure change curve during the pressurization of said diagnosis zone as the data indicating said pressure rise characteristic, and wherein said step of detecting the data indicating said pressure drop characteristic:

detects a pressure drop amount within a period of time after the stop of pressurization of said diagnosis zone, wherein said step of diagnosing an occurrence of leakage comprises the steps of:

judging that there is no leakage, when an absolute value of said curvature is smaller than a first threshold, and also said pressure drop amount is smaller than a second threshold;

judging an occurrence of leakage when the absolute value of said curvature is equal to or larger than the first threshold; and judging an occurrence of leakage when said pressure drop amount is equal to or larger than the second threshold.

9. A leakage diagnosis method for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

pressurizing said diagnosis zone;

detecting the pressure in said diagnosis zone;

detecting data indicating a pressure rise characteristic in said diagnosis zone for when said diagnosis zone is pressurized in a state where said diagnosis zone is blocked;

detecting data indicating a pressure drop characteristic in said diagnosis zone after the pressurization of said diagnosis zone is stopped; and diagnosing an occurrence of leakage in said diagnosis zone based on the data indicating said pressure rise characteristic and the data indicating said pressure drop characteristic, wherein said step of blocking the diagnosis zone blocks a diagnosis zone containing said fuel tank, and further comprises the steps of:

detecting a remaining fuel quantity in said fuel tank; and correcting the data indicating said pressure rise characteristic and the data indicating said pressure drop characteristic based on said remaining fuel quantity.

10. A leakage diagnosis method for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

pressurizing said diagnosis zone;

detecting the pressure in said diagnosis zone;

detecting data indicating a pressure rise characteristic in said diagnosis zone for when said diagnosis zone is pressurized in a state where said diagnosis zone is blocked;

detecting data indicating a pressure drop characteristic in said diagnosis zone after the pressurization of said diagnosis zone is stopped; and diagnosing an occurrence of leakage in said diagnosis zone based on the data indicating said pressure rise characteristic and the data indicating said pressure drop characteristic, wherein said step of blocking the diagnosis zone blocks a diagnosis zone containing said fuel tank, and further comprises the steps of:

detecting a fuel property in said fuel tank; and correcting the data indicating said pressure rise characteristic and the data indicating said pressure drop characteristic based on said fuel property.

11. A leakage diagnosis method for a fuel vapor purge system according to claim 10, wherein said step of detecting the property of fuel further comprises the steps of:

detecting the data indicating said pressure rise characteristic in said diagnosis zone due to the fuel vapor when said diagnosis zone is blocked; and detecting said fuel property, based on the data indicating said pressure rise characteristic due to the fuel vapor.

12. A leakage diagnosis method for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

pressurizing said diagnosis zone;

detecting the pressure in said diagnosis zone;

detecting data indicating a pressure rise characteristic in said diagnosis zone for when said diagnosis zone is pressurized in a state where said diagnosis zone is blocked;

detecting data indicating a pressure drop characteristic in said diagnosis zone after the pressurization of said diagnosis zone is stopped; and diagnosing an occurrence of leakage in said diagnosis zone based on the data indicating said pressure rise characteristic and the data indicating said pressure drop characteristic, wherein said step of blocking the diagnosis zone blocks a diagnosis zone containing said fuel tank, and further comprises the steps of:

detecting a fuel quantity in said fuel tank; and suspending the diagnosis of occurrence of leakage when said remaining fuel quantity is equal to or less than a predetermined amount.

13. A leakage diagnosis method for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

pressurizing said diagnosis zone;

detecting the pressure in said diagnosis zone;

detecting data indicating a pressure rise characteristic in said diagnosis zone for when said diagnosis zone is pressurized in a state where said diagnosis zone is blocked;

detecting data indicating a pressure drop characteristic in said diagnosis zone after the pressurization of said diagnosis zone is stopped; and diagnosing an occurrence of leakage in said diagnosis zone based on the data indicating said pressure rise characteristic and the data indicating said pressure drop characteristic, wherein said step of blocking the diagnosis zone blocks a diagnosis zone containing said fuel tank, and further comprises the steps of:

detecting a fuel quantity in said fuel tank; and suspending the diagnosis of occurrence of leakage when said remaining fuel quantity is equal to or larger than a predetermined amount.

14. A leakage diagnosis method for a fuel vapor purge system, in which fuel vapor generating in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

pressurizing said diagnosis zone;

detecting the pressure in said diagnosis zone;

detecting data indicating a pressure rise characteristic in said diagnosis zone for when said diagnosis zone is pressurized in a state where said diagnosis zone is blocked;

detecting data indicating a pressure drop characteristic in said diagnosis zone after the pressurization of said diagnosis zone is stopped; and diagnosing an occurrence of leakage in said diagnosis zone based on the data indicating said pressure rise characteristic and the data indicating said pressure drop characteristic, wherein said step of blocking the diagnosis zone blocks a diagnosis zone containing said fuel tank, and further comprises the step of:

suspending the diagnosis of occurrence of leakage when a pressure rise amount in said diagnosis zone due to the fuel vapor for when said diagnosis zone is blocked, does not reach a predetermined value within a period of time.

* * * * *